(12) United States Patent
Heppel et al.

(10) Patent No.: US 8,408,570 B2
(45) Date of Patent: Apr. 2, 2013

(54) VEHICLE SIDE FAIRING SYSTEM

(75) Inventors: Peter Heppel, Paris (FR); Herbert Golding, Lincolnshire, IL (US); Doug Memering, Columbus, IN (US); James Reiman, Winnetka, IL (US); Daniel Peterson, Chicago, IL (US); William Bowman, Hamilton, OH (US)

(73) Assignee: Aerofficient LLC, Livonia, MI (US)

( * ) Notice: Subject to any disclaimer, the term of this patent is extended or adjusted under 35 U.S.C. 154(b) by 571 days.

(21) Appl. No.: 12/185,468

(22) Filed: Aug. 4, 2008

(65) Prior Publication Data

US 2009/0212595 A1 Aug. 27, 2009

Related U.S. Application Data

(60) Provisional application No. 61/030,428, filed on Feb. 21, 2008.

(51) Int. Cl.
B62D 25/16 (2006.01)

(52) U.S. Cl. ........ 280/154; 280/847; 280/848; 280/849; 296/180.4

(58) Field of Classification Search .................. 280/154, 280/159, 160, 847–849, 851, 854; 180/903; 296/180.4, 180.1, 181.5, 186.1, 186.4, 186.5; 105/1.1, 1.3

See application file for complete search history.

(56) References Cited

U.S. PATENT DOCUMENTS

| | | | |
|---|---|---|---|
| 2,101,793 A | 12/1937 | Field, Jr. | |
| 2,605,119 A * | 7/1952 | Earnest | 280/849 |
| 3,574,300 A | 4/1971 | Moore | |
| 3,711,146 A | 1/1973 | Madzsar et al. | |
| 3,834,752 A | 9/1974 | Cook et al. | |
| 4,036,519 A | 7/1977 | Servais et al. | |
| 4,142,755 A | 3/1979 | Keedy | |
| 4,156,543 A | 5/1979 | Taylor et al. | |
| 4,311,334 A | 1/1982 | Jenkins | |
| 4,518,188 A * | 5/1985 | Witten | 296/180.2 |
| 4,553,782 A | 11/1985 | Markland | |
| 4,585,262 A * | 4/1986 | Parks | 296/180.1 |
| 4,611,847 A * | 9/1986 | Sullivan | 296/180.2 |
| 4,682,808 A | 7/1987 | Bilanin | |
| 4,688,841 A | 8/1987 | Moore | |
| 4,693,506 A | 9/1987 | Massengill | |
| 4,702,509 A | 10/1987 | Elliott, Sr. | |
| 4,746,160 A * | 5/1988 | Weisemeyer | 296/180.2 |
| 4,779,915 A | 10/1988 | Straight | |
| 4,824,165 A | 4/1989 | Fry | |
| 4,904,015 A | 2/1990 | Haines | |
| 5,078,448 A | 1/1992 | Selzer et al. | |
| 5,092,648 A | 3/1992 | Spears | |
| 5,137,296 A * | 8/1992 | Forman | 280/407.1 |
| 5,199,732 A * | 4/1993 | Lands et al. | 280/407.1 |
| 5,269,547 A * | 12/1993 | Antekeier | 280/154 |
| 5,280,990 A * | 1/1994 | Rinard | 296/180.1 |
| 5,346,233 A * | 9/1994 | Moser | 280/149.2 |
| 5,595,419 A | 1/1997 | Spears | |
| 5,609,384 A * | 3/1997 | Loewen | 296/180.4 |
| 5,658,038 A | 8/1997 | Griffin | |
| 5,863,057 A * | 1/1999 | Wessels | 280/149.2 |
| 5,921,617 A * | 7/1999 | Loewen et al. | 296/180.4 |

(Continued)

Primary Examiner — J. Allen Shriver, II
Assistant Examiner — Travis Coolman
(74) Attorney, Agent, or Firm — Fitzpatrick, Cella, Harper & Scinto

(57) ABSTRACT

A vehicle side fairing having a first fairing panel fixedly secured to the underside of a trailer box, and a second fairing panel slidable mounted to plural cylindrical bars mounted on the underside of the trailer box in a fore and aft orientation. The second fairing panel is secured to the wheel set with a mechanical fastener that selectively joins and releases the second fairing panel and the wheel set.

15 Claims, 5 Drawing Sheets

U.S. PATENT DOCUMENTS

| | | |
|---|---|---|
| 6,428,084 B1 | 8/2002 | Liss |
| 6,644,720 B2 * | 11/2003 | Long et al. ................. 296/180.4 |
| 6,799,791 B2 | 10/2004 | Reiman |
| 6,932,419 B1 * | 8/2005 | McCullough .............. 296/180.1 |
| 6,955,369 B1 * | 10/2005 | Schiebout et al. ............ 280/154 |
| 6,986,544 B2 | 1/2006 | Wood |
| 7,008,005 B1 | 3/2006 | Graham |
| 7,374,229 B1 | 5/2008 | Noll et al. .................. 296/180.2 |
| 7,404,592 B2 | 7/2008 | Reiman |
| 7,410,183 B2 * | 8/2008 | Stowell et al. ............ 280/149.2 |
| 7,578,541 B2 * | 8/2009 | Layfield et al. ............ 296/180.2 |
| 7,604,284 B2 | 10/2009 | Reiman |
| 7,748,772 B2 * | 7/2010 | Boivin et al. .............. 296/180.4 |
| 7,806,464 B2 * | 10/2010 | Cardolle .................... 296/180.4 |
| 7,942,466 B2 | 5/2011 | Reiman et al. ............. 296/180.4 |
| 2003/0057736 A1 | 3/2003 | Long et al. ................. 296/180.4 |
| 2004/0239146 A1 | 12/2004 | Ortega et al. |
| 2006/0152038 A1 | 7/2006 | Graham |
| 2007/0182207 A1 | 8/2007 | Nakaya ...................... 296/180.1 |
| 2008/0238139 A1 | 10/2008 | Cardolle ................... 296/180.4 |
| 2008/0315622 A1 | 12/2008 | Oda .......................... 296/180.1 |
| 2009/0212595 A1 | 8/2009 | Heppel et al. .............. 296/180.4 |

* cited by examiner

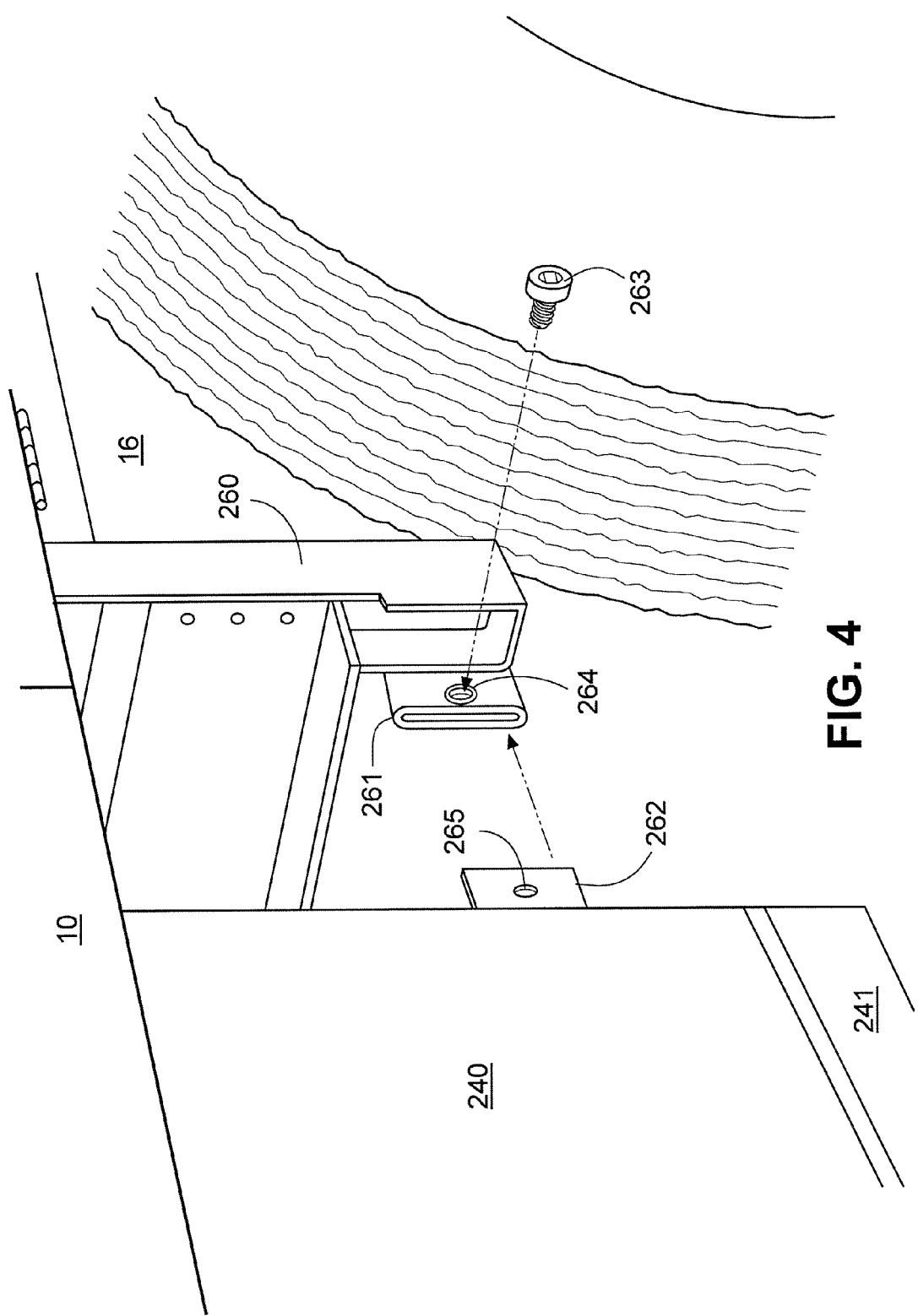

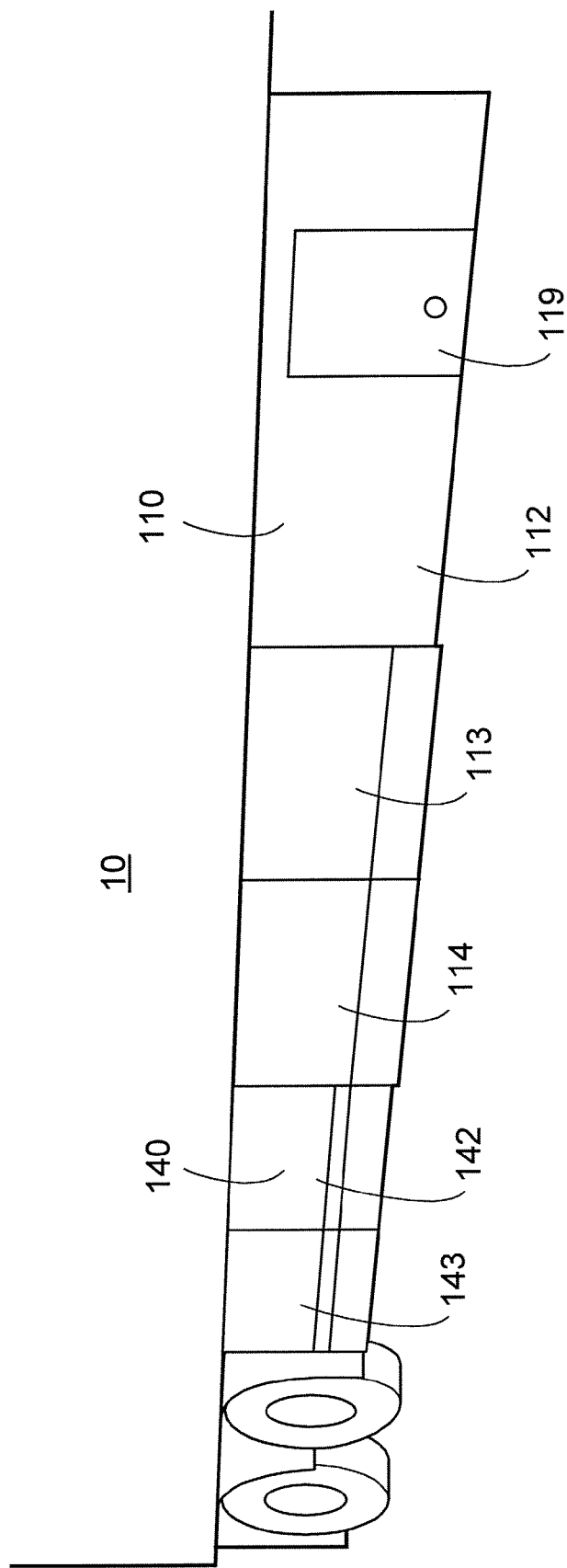

VEHICLE SIDE FAIRING SYSTEM

This application claims the benefit of U.S. Provisional Application No. 61/030,428, filed Feb. 21, 2008, and incorporated by reference herein.

This invention relates to a system for improving the aerodynamic profile of vehicles by utilizing side vehicle fairing structures, especially for use on a tractor-trailer. The system improves fuel consumption without having a material adverse impact on vehicle operation or service procedures.

BACKGROUND OF THE INVENTION

DESCRIPTION OF RELATED ART

The amount of power needed to move a vehicle over land or through the air increases with the speed of the vehicle due to aerodynamic drag. The amount of power necessary to overcome aerodynamic drag directly translates into increased fuel consumption, and thus cost of operation.

A variety of innovations aimed at reducing the aerodynamic drag of various transport vehicles, including tractor-trailer combinations, have been introduced in the prior art. These include efforts to make the hood, windscreen, fenders, etc. more streamlined in form, as well as by adding fairings to the cab roof, and in some cases, to the trailer box.

U.S. Pat. No. 6,799,791 discloses a vehicle fairing structure that may be deployed on the rear of a trailer box to reduce drag at the rear end of the trailer box. Since a significant amount of drag is also associated with the front of the trailer box, where there is known to be an area of high pressure and relatively stagnant air approximately at the middle of the forward vertical face of the trailer cab, a front fairing structure for reducing this drag is disclosed in U.S. patent application Ser. No. 11/684,097, filed Mar. 9, 2007. A system that includes side fairings to further reduce drag is disclosed in U.S. patent application Ser. No. 11/684,104, also filed Mar. 9, 2007. The foregoing patent and applications (U.S. Pat. No. 6,799,791, and U.S. patent application Ser. Nos. 11/684,097 and 11/684,104) are incorporated herein by reference.

The invention disclosed herein is to further optimize the design of the vehicle side fairing.

SUMMARY OF THE INVENTION

In one aspect of the present invention, there is provided a first fairing panel secured to a trailer box at a fixed position proximate to the periphery of a trailer box side; and a second fairing panel slidably mounted to a plurality of spaced-apart bars each having a cylindrical cross section, the bars mounted to the underside of the trailer box in a fore and aft orientation. The plurality of bars are positioned on the underside of the trailer box such that the second panel is proximate to the trailer box side, and when the wheel set and rear fairing panel are in their aft-most positions a forward portion of the second fairing panel is proximate to a rear portion of the first fairing panel. Further, the second fairing panel is secured to the wheel set so that the the second fairing panel can be moved with an adjustment in the position of the wheel set.

In another aspect of the present invention, there is provided a first fairing panel secured to a trailer box at a fixed position proximate to the periphery of a trailer box side; and a second fairing panel slidably mounted to the underside of the trailer box in a fore and aft orientation so that the second panel is proximate to the trailer box side. When the wheel set and rear fairing panels are in their aft-most positions a forward portion of the second fairing panel is proximate to a rear portion of the first fairing panel. Also, at least one of the second fairing panel and the wheel set includes a mechanical fastener that selectively joins and releases the second fairing panel and the wheel set so that the second fairing panel can be moved with or without an adjustment in the position of the wheel set.

In a further aspect of the present invention, there is provided a first fairing panel, comprising a plurality of panel segments secured to the trailer box, using one or more hand or hand tool releasable fasteners, at a fixed position proximate to the periphery of a trailer box side; and a second fairing panel, comprising a plurality of panel segments, slidably mounted, using one or more hand or hand tool releasable fasteners, to the underside of the trailer box in a fore and aft orientation so that the second panel is proximate to the trailer box side. When the wheel set and rear fairing panels are in their aft-most positions, a forward portion of the second fairing panel is proximate to a rear portion of the first fairing panel. The second fairing panel is secured to the wheel set so that the second fairing panel can be moved with an adjustment in the position of the wheel set. In addition, the panel segments of the first fairing panel are joined together with one or more hand or hand tool releasable fasteners, and the panel segments of the second fairing panel are joined together with one or more hand or hand tool releasable fasteners.

BRIEF DESCRIPTION OF THE DRAWINGS

FIG. 4 is a schematic perspective view of a means to fasten rear fairing panel 240 to fore and aft positionable wheel assembly 16.

FIG. 5 is a schematic perspective view depicting the segments of front fairing panel 110 and rear fairing panel 140.

DETAILED DESCRIPTION OF THE PREFERRED EMBODIMENTS

Figure 1:
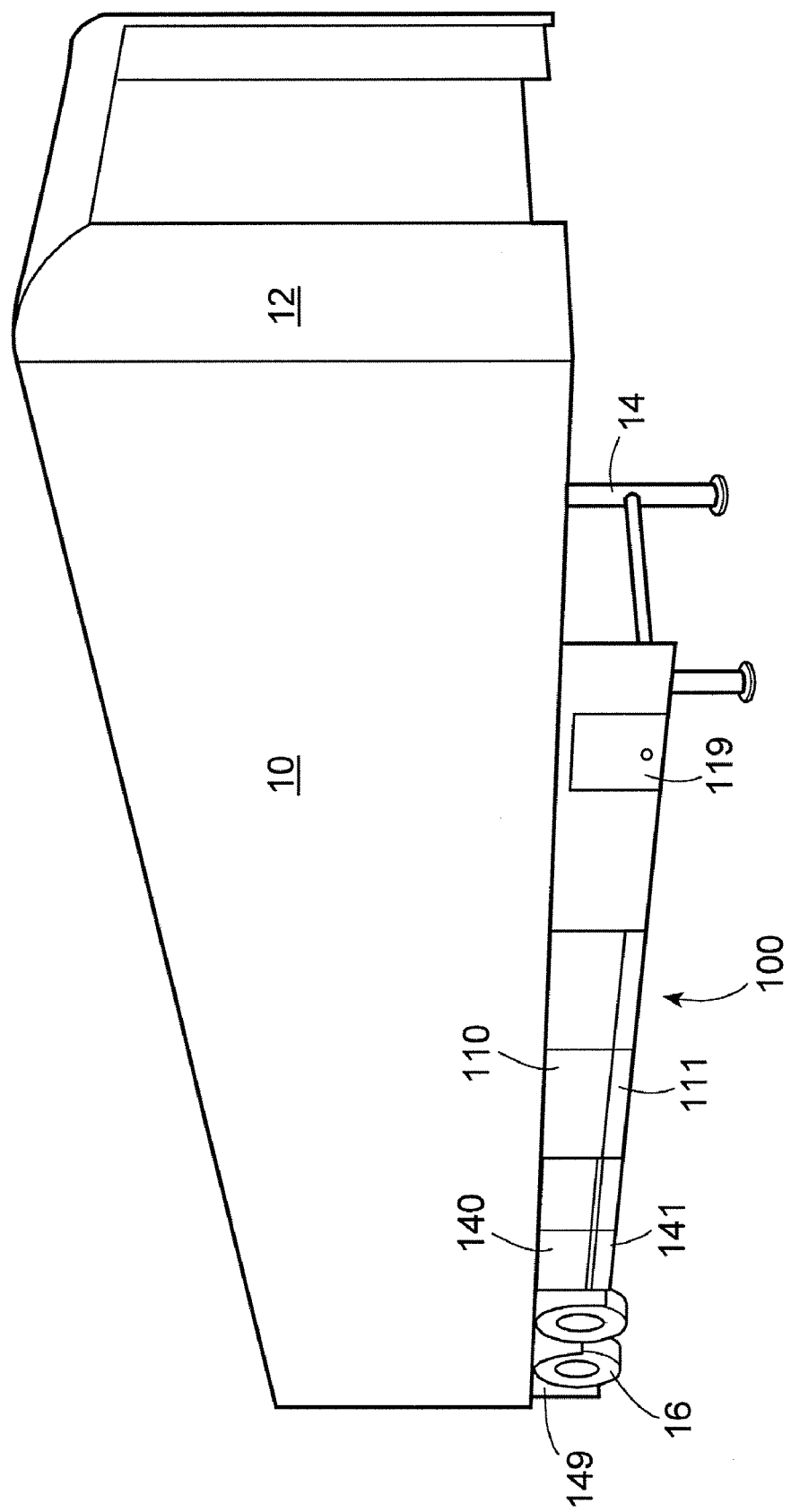
FIG. 1 is a schematic perspective view of the vehicle side fairing disclosed herein.

FIG. 1 generally depicts a truck trailer box 10 equipped with the side fairing invention, fairing assembly 100, described herein. It is also shown depicted with a front gap closing fairing 12, as more fully described in U.S. patent application Ser. No. 11/684,097. Trailer box 10 includes a wheel assembly 16 proximate to the rear of trailer box 10. As is conventional, wheel assembly 16 can be positioned fore and aft to accommodate variations in payload weight and distribution in trailer box 10. Trailer box 10 also includes a landing gear assembly 14, to permit trailer box 10 to sit level and to allow elevation of trailer box 10 so that a tractor (not shown) can be attached to and detached from trailer box 10.

Fairing assembly 100 is shown in FIG. 1 on the right side of trailer 10. It should be understood that there is a comparable fairing assembly 200 (not shown in FIG. 1) on the left side of trailer 10. The purpose of assemblies 100 and 200 is to inhibit the airstream from entering the area underneath trailer box 10, and thereby reduce aerodynamic drag.

Fairing assembly 100 includes forward fairing panel 110 and rear fairing panel 140. These panels 110 and 140 are generally rectangular planar structures extending in the vertical direction downward from the bottom periphery of the sides of the trailer box 10 to just above the road surface. In one embodiment, approximately 8 inches of clearance is left between the bottoms of panels 110, 140 and the road.

Forward fairing panel 110 is fixedly secured to trailer box 10, wherein rear fairing panel 140 is movably secured to trailer box 10, as described further below, such that panel 140 moves fore and aft on trailer box 10 as wheel assembly 16 is moved fore and aft. As is seen in FIG. 1, the panels 110, 140 are positioned proximate to the trailer box sides such that each preferably forms a roughly continuous surface (although, as is particularly apparent in the case of rear fairing panel 140, not perfectly continuous) with the side of trailer box 10 to which it is adjacent. When wheel assembly 16 is in its rear most position, the front edge of rear fairing panel 140 is proximate to the rear edge of front fairing panel 110. This proximate relationship can include an initial overlapping relationship. As wheel assembly 16 is positioned further forward, the front portion of rear fairing panel 140 comes to overlap, or comes to further overlap, the rear portion of front fairing panel 150, with panel 140 preferably overlapping inside panel 110 (viewed from the perspective of an observer standing at the side of the trailer).

Aft of rear fairing panel 140 is wheel inspection port 149. Port 149 is a generally planar surface, preferably made of sheet steel, aluminum or plastic, which optionally may have roughly circular cut-outs approximately the shape and size of the tires, as illustrated in FIG. 1. Wheel inspection port 149 is hinged to the lower edge of trailer box 10 to swing upwardly. This permits easier tire change and wheel assembly inspection. Gear inspection port 119, which is part of forward fairing panel 110, is likewise hinged to swing upwardly. This permits the operator to gain access to landing gear 14.

Forward fairing panel 110 includes a bottom impact amelioration section 111 secured to its lower edge. The width (measured vertically) of section 111 can be increased or decreased as desired. As shown, the width of section 111 is approximately 8 inches. Section 111 extends from the back of forward fairing panel 110 along the lower edge of fairing panel 110 forward to a desired position—the forward ending position of section 111 may be as far forward as the forward end of panel 110, or positioned back from the forward end of panel 110 at any point desired, such as behind where the tractor joins the trailer box 10, since there is reduced risk of damage proximate to where the tractor is connected the trailer box 10.

Likewise, rear fairing panel 140 includes a bottom impact amelioration section 141 secured to its lower edge. Section 141 can be of like width as section 110, and preferably extends along the entire length of panel 140.

The purpose of sections 111 and 141 is to reduce or eliminate damage to fairing assemblies 100 and 140 that may inadvertently occur if the operator backs down sharply inclined loading docks, or cuts turns too close to raised curbs, or the like. Sections 111 and 141 can be made of a crushable material, such as lightweight honeycomb, removably mounted with bolts or the like to permit easy replacement in the field. Alternatively, sections 111 and 141 can be constructed of a vertically oriented flexible bristle material or other material which returns to its original position after minor impact.

Figure 2:
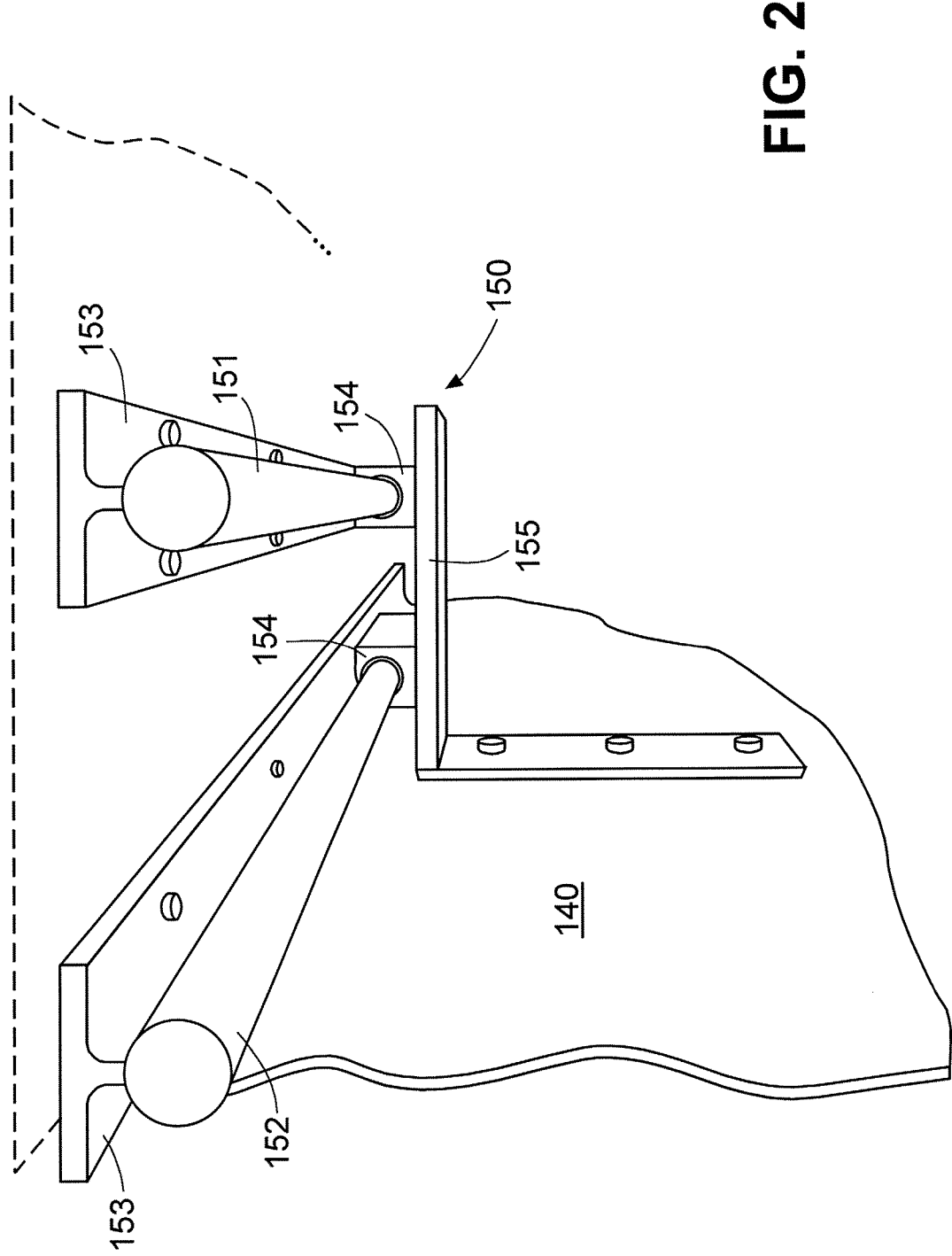
FIG. 2 is a schematic perspective view of the slider assembly that permits fore and aft movement of the rear fairing panels.

As explained above, rear fairing panel 140 is movably secured to trailer box 10. FIG. 2 depicts an embodiment for providing this functionality. In particular, there is shown two spaced-apart bars, an inner slide bar 151 and an outer slide bar 152 which are each respectively secured to a T-section 153. The T-sections 153 in turn are secured to the underside of the trailer box 10 at a location such that bars 151, 152 are located near the periphery of the underside of trailer box 10 and are parallel to the sides of trailer box 10. Bars 151, 152 are preferably approximately or generally circular in cross-section, to reduce the potential for torque forces to cause binding, and to ease removal of road grit and ice build-up, although non-cylindrical tracks can be used as well.

As shown in FIG. 2, the horizontal portion of a right-angle mounting bracket 155 is secured to two slide bearings 154, which in turn are each positioned around bars 151, 152 to allow mounting bracket 155 to move along the lengths of bars 151, 152. The vertical portion of right-angle mounting bracket 155 is fastened to rear fairing panel 140, preferably using fasteners, such as nut-bolt sets, or other fasteners that are releasable, and optionally fastenable, by hand or with use of hand tools. This arrangement permits fairing panel to slide fore and aft parallel to the sides of trailer box 10. Although only one bracket 155 is shown, it should be understood that use of two or more such brackets, spaced along the length of rear fairing panel 140, is preferred to provide adequate support and permit easy sliding.

As discussed above, the wheel assembly 16 can be fore and aft positioned in accordance with the nature of the load. In this regard, the rear fairing panels of the subject invention can be position-adjusted, in accordance with the position of wheel assembly 16, to preclude there being a gap in the side fairings and so that the aerodynamics remain optimized. Reference to describe this feature is made to FIGS. 3 and 4, which depict a portion of rear fairing panel 240 (the left-side counterpart of rear fairing panel 140). In FIG. 4, descending vertical strut 260 is part of wheel assembly 16 and moves fore and aft with wheel assembly 16. A retaining box 261 is fastened to strut 16, as by welding, brazing, bolting, or the like. This retaining box is adapted, as shown, to receive within it a fairing tab 262 that is affixed to rear fairing panel 240 at a position that allows it to slide in and out of retaining box 261. A hole 264 is located on the outer face of retaining box 261, which mates with a corresponding hole 265 in fairing tab 262 when fairing tab 262 is inserted in retaining box 261.

A securing fastener 263 is threaded to engage a correspondingly threaded portion of retaining box 264. Thus when fairing tab 262 is inserted in retaining box 261, securing fastener 263 can be inserted into holes 264, 265 and rotated to engage the threaded portion of retaining box 264 and thereby secure rear fairing 240 to wheel assembly 16. Hence when wheel assembly 16 is moved forward (or aft), rear fairing 240 slides on inner and outer slide bars 251, 252 correspondingly (not shown; these are the counterparts to slide bars 151, 152 shown in FIG. 2). Thus the exposed length of rear fairing panels 140, 240 are automatically adjusted as wheel assembly 16 is moved forward and aft.

Figure 3A:
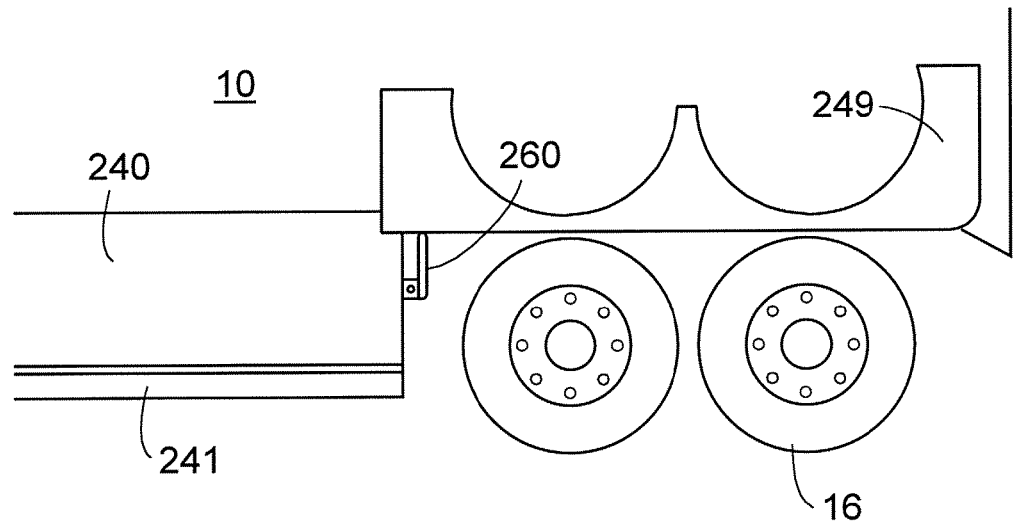
FIGS. 3A and 3B are schematic side views showing the fore and aft movement of the rear fairing panel 240.
Figure 3B:
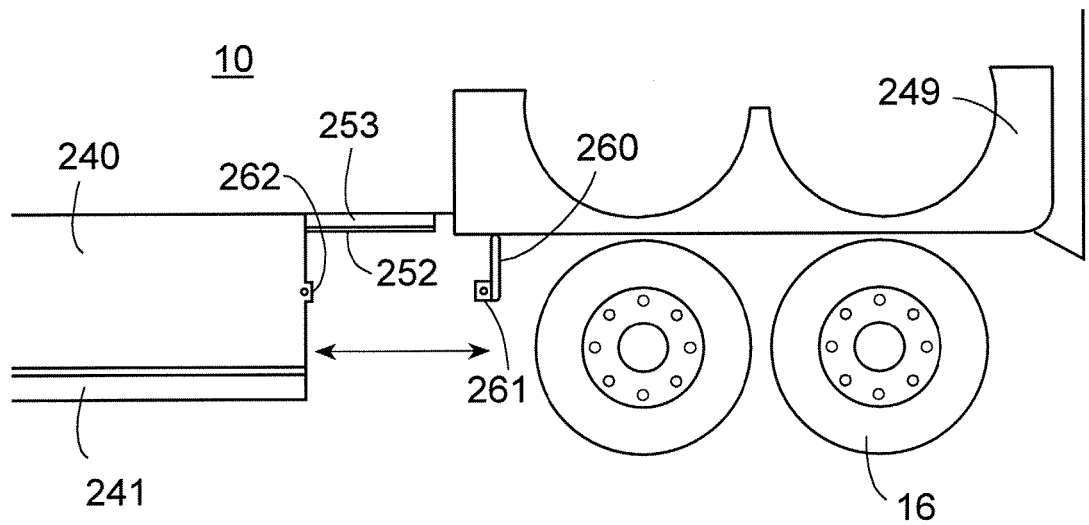

Alternatively, this invention allows the operator first to rotate and loosen securing fastener 263; remove, if necessary, fastener 263; slide rear fairing panel 240 forward; and then adjust the position of wheel assembly 16. In addition, given the ease by which an operator can release securing fastener 16, (e.g. in the embodiment depicted, by use of a nut driver or the like), the operator on the road can readily slide rear fairing panel 240 forward to permit easy inspection of the brakes, tires, wheel assembly, or the like, as shown in FIGS. 3A, 3B.

In the preferred embodiment, each of rear fairing panels 140, 240 are located inboard of forward fairing panels 110, 210. Thus as rear fairing panels 140, 240 move forward, from the standpoint of an observer standing at the side of the truck the forward portions of rear fair panels 140, 240 disappear behind the rear portions of forward fairing panels 110, 210.

The securing fastener 263 and the portions of retaining box 261 which receive it can be of any number of variations, as would be apparent to one of ordinary skill. For example, FIG.

4 depicts a threaded bolt, which is received by a correspondingly threaded portion of retaining box 261. This threaded bolt can be made captive in retaining box 261 to prevent loss, in a variety of ways apparent to a person of ordinary skill. Alternatively, quarter-turn or fast lead Dzus fasteners can be employed.

The panels 110, 210, 140, 240 can be fabricated from sheet steel, aluminum, plastic, or other panel material, and fastened to a structural frame of steel, aluminum, plastic or other angle stock material to enhance rigidity. It is preferred that the panels be made of two or more sections or segments fastened together in a manner that permits the operator to readily disassemble and remove segments when in service. This aspect of the invention advantageously permits the operator to remove damaged segments, without the need for a service call or other outside assistance. Thus FIG. 5 depicts front fairing panel 110 as made up of three segments 112, 113 and 114 and rear fairing panel 140 as made up of two segments 142 and 143. The segments in general are sized to permit relatively easy handling by a single operator. The segments are bolted or otherwise fastened together to permit operator disassembly, for example, by overlapping the sheets and installing nut-bolt sets spaced along the overlapping section, or other fasteners which are removable, and optionally fastenable, by hand or with use of hand tools. Alternatively, rivets or other more permanent fastening methods can be used, in the event field disassembly as described above is not desired.

The front fairing panels 110, 210 can be secured to the underside of trailer box 10 in any suitable manner, such as by use of one or more brackets such as mounting brackets 155 (use of two or more is preferred), except that the brackets are directly secured to the underside of trailer box 10, rather than to slide bearings 154. In the event such brackets are employed, the front fairing panels 110, 210 are preferably secured to them using fasteners, such as nut-bolt sets, or other fasteners that are removable, and optionally fastenable, by hand or with the use of hand tools. Such a means of securing panels 110, 210, and the like means preferably used to secure panels 140, 240 to one or more brackets 155, as described earlier, further facilitates removal of damaged segments by the operator in the field.

The assembly sequence should take into account the need for proper fore and aft movement of rear fairing panels 140, 240. In areas where there may be overlap between panels 110, 140 and 210, 240, respectively, this can be accomplished by first fastening the brackets for front fairing panels 110, 210, and thereafter fastening the T-sections 153, with the latter being provided with appropriate cut-outs for such brackets as are used. Other means for accomplishing this end will be evident to a person of ordinary skill in the art.

It should be understood that the present invention is advantageously utilized in conjunction with the front fairing 12 depicted in FIG. 1, and more fully disclosed in U.S. patent application Ser. No. 11/684,097, and with the rear fairing structure disclosed in U.S. Pat. No. 6,799,791.

What is claimed is:

1. A side fairing mounted on a trailer, the trailer having a trailer box and a fore and aft positionally adjustable wheel set, the side fairing comprising:
   a first fairing panel secured to the trailer box at a fixed position proximate to a trailer box side; and
   a second fairing panel secured to a mounting support structure,
   wherein the mounting support structure is slidably secured independent of the wheel set to one or more spaced-apart bars or tracks, the bars or tracks mounted to the underside of the trailer box in a fore and aft orientation,
   wherein the mounting support structure receives the one or more spaced-apart bars or tracks therethrough,
   wherein the one or more bars or tracks are positioned on the underside of the trailer box such that the second panel is proximate to the trailer box side, and when the wheel set and rear fairing panel are in their aft-most positions a forward portion of the second fairing panel is proximate to a rear portion of the first fairing panel, and
   wherein the second fairing panel is secured to the wheel set so that the second fairing panel can be moved with an adjustment in the position of the wheel set.

2. The side fairing mounted on a trailer as in claim 1, further including an impact amelioration section secured to the lower edge of the second fairing panel.

3. The side fairing mounted on a trailer as in claim 2, wherein the impact amelioration section is a flexible bristle material.

4. The side fairing mounted on a trailer as in claim 1, further comprising a plurality of slide bearings, each slide bearing securing the mounting support structure to a respective one of the plurality of spaced apart bars or tracks.

5. A side fairing mounted on a trailer, the trailer having a trailer box and a fore and aft positionally adjustable wheel set, the side fairing comprising:
   a first fairing panel secured to the trailer box at a fixed position proximate to a trailer box side; and
   a second fairing panel secured to a mounting support structure,
   wherein the mounting support structure is slidably secured independent of the wheel set to one or more spaced-apart bars or tracks, the bars or tracks mounted to the underside of the trailer box in a fore and aft orientation so that the second panel is proximate to the trailer box side, and when the wheel set and rear fairing panels are in their aft-most positions a forward portion of the second fairing panel is proximate to a rear portion of the first fairing panel,
   wherein the mounting support structure receives the one or more spaced-apart bars or tracks therethrough, and
   wherein at least one of the second fairing panel and the wheel set includes a mechanical fastener that selectively joins and releases the second fairing panel and the wheel set so that the second fairing panel can be moved with or without an adjustment in the position of the wheel set.

6. The side fairing mounted on a trailer as in claim 5, further including an impact amelioration section secured to the lower edge of the second fairing panel.

7. The side fairing mounted on a trailer as in claim 6, wherein the impact amelioration section is a flexible bristle material.

8. A side fairing mounted on a trailer, the trailer having a trailer box and a fore and aft positionally adjustable wheel set, the side fairing comprising:
   a first fairing panel, comprising a plurality of panel segments secured to the trailer box, using one or more hand or hand tool releasable fasteners, at a fixed position proximate to a trailer box side; and
   a second fairing panel, comprising a plurality of panel segments, secured to a mounting support structure,
   wherein the mounting support structure is slidably secured independent of the wheel set to one or more spaced-apart bars or tracks that are mounted to the underside of the trailer box in a fore and aft orientation,
   wherein the mounting support structure receives the one or more spaced-apart bars or tracks therethrough,
   wherein the second fairing panel is secured to the wheel set using one or more hand or hand tool releasable fasteners, wherein the second fairing panel is proximate to the trailer box side, and when the wheel set and rear fairing panels are in their aft-most positions a forward portion of the second fairing panel is proximate to a rear portion of the first fairing panel, wherein the second fairing panel is secured to the wheel set so that the second fairing panel can be moved with an adjustment in the position of the wheel set, and wherein the panel segments of the first fairing panel are joined together with one or more hand or hand tool releasable fasteners, and the panel segments of the second fairing panel are joined together with one or more hand or hand tool releasable fasteners.

9. The side fairing mounted on a trailer as in claim 8, further comprising a plurality of slide bearings, each slide bearing securing the mounting support structure to a respective one of the plurality of spaced apart bars or tracks.

10. The side fairing mounted on a trailer as in claim 8, further including an impact amelioration section secured to the lower edge of the second fairing panel.

11. The side fairing mounted on a trailer as in claim 10, wherein the impact amelioration section is a flexible bristle material.

12. The side fairing mounted on a trailer as in claim 5, further comprising a plurality of slide bearings, each slide bearing securing the mounting support structure to a respective one of the plurality of spaced apart bars or tracks.

13. A side fairing mounted on a trailer, the trailer having a trailer box and a fore and aft positionally adjustable wheel set, the side fairing comprising:

a first fairing panel, comprising a plurality of panel segments secured to the trailer box, using one or more hand or hand tool releasable fasteners, at a fixed position proximate to a trailer box side;

a second fairing panel, comprising a plurality of panel segments, secured to a mounting support structure, wherein the mounting support structure is slidably secured independent of the wheel set to a plurality of spaced-apart bars or tracks that are mounted to the underside of the trailer box in a fore and aft orientation, wherein the second fairing panel is secured to the wheel set using one or more hand or hand tool releasable fasteners, wherein the second fairing panel is proximate to the trailer box side, and when the wheel set and rear fairing panels are in their aft-most positions a forward portion of the second fairing panel is proximate to a rear portion of the first fairing panel, wherein the second fairing panel is secured to the wheel set so that the second fairing panel can be moved with an adjustment in the position of the wheel set, and wherein the panel segments of the first fairing panel are joined together with one or more hand or hand tool releasable fasteners, and the panel segments of the second fairing panel are joined together with one or more hand or hand tool releasable fasteners; and a plurality of slide bearings, each slide bearing securing the mounting support structure to a respective one of the plurality of spaced apart bars or tracks.

14. A side fairing mounted on a trailer, the trailer having a trailer box and a fore and aft positionally adjustable wheel set, the side fairing comprising:

a first fairing panel secured to the trailer box at a fixed position proximate to a trailer box side;

a second fairing panel secured to a mounting support structure, wherein the mounting support structure is slidably secured independent of the wheel set to a plurality of spaced-apart bars or tracks, the bars or tracks mounted to the underside of the trailer box in a fore and aft orientation, wherein the plurality of bars or tracks are positioned on the underside of the trailer box such that the second panel is proximate to the trailer box side, and when the wheel set and rear fairing panel are in their aft-most positions a forward portion of the second fairing panel is proximate to a rear portion of the first fairing panel, and wherein the second fairing panel is secured to the wheel set so that the second fairing panel can be moved with an adjustment in the position of the wheel set; and a plurality of slide bearings, each slide bearing securing the mounting support structure to a respective one of the plurality of spaced apart bars or tracks.

15. A side fairing mounted on a trailer, the trailer having a trailer box and a fore and aft positionally adjustable wheel set, the side fairing comprising:

a first fairing panel secured to the trailer box at a fixed position proximate to a trailer box side;

a second fairing panel secured to a mounting support structure, wherein the mounting support structure is slidably secured independent of the wheel set to a plurality of spaced-apart bars or tracks, the bars or tracks mounted to the underside of the trailer box in a fore and aft orientation so that the second panel is proximate to the trailer box side, and when the wheel set and rear fairing panels are in their aft-most positions a forward portion of the second fairing panel is proximate to a rear portion of the first fairing panel, and wherein at least one of the second fairing panel and the wheel set includes a mechanical fastener that selectively joins and releases the second fairing panel and the wheel set so that the second fairing panel can be moved with or without an adjustment in the position of the wheel set; and a plurality of slide bearings, each slide bearing securing the mounting support structure to a respective one of the plurality of spaced apart bars or tracks.

* * * * *